Jan. 5, 1926.
W. B. SWART
1,568,639
VARIABLE VELOCITY RATIO GEARING
Filed May 17, 1922
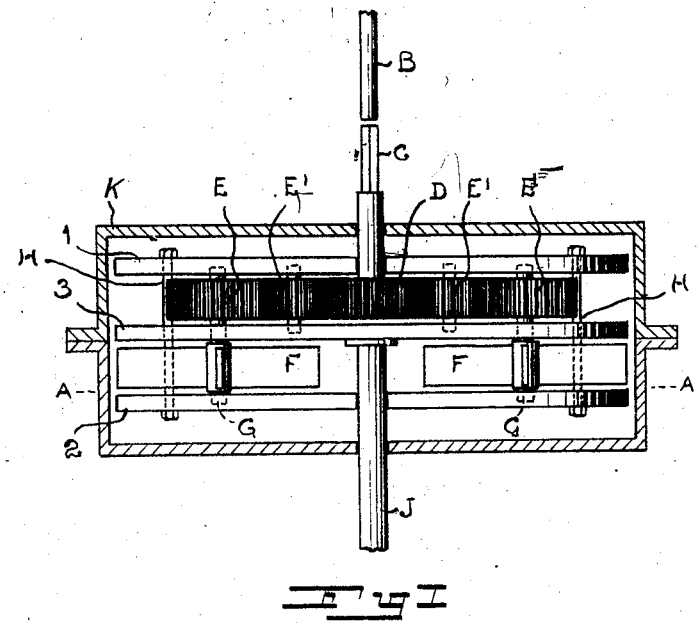
Fig. I
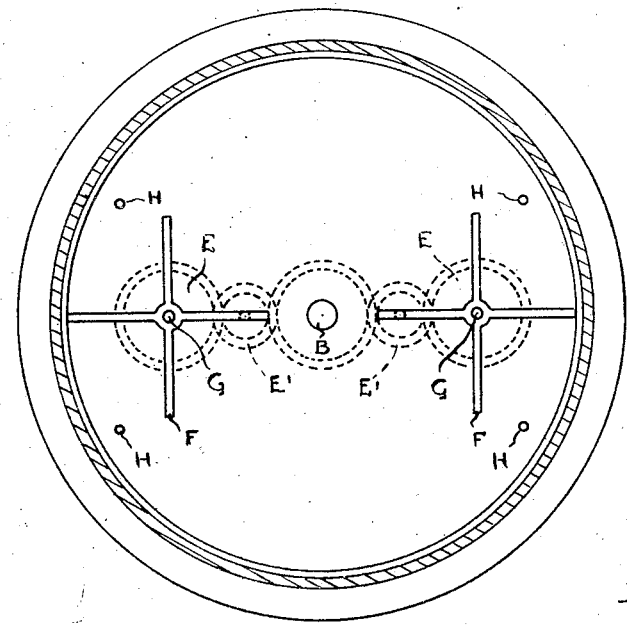
Fig. II
Inventor:
William Basil Swart
By [signature]
Attorney.

Patented Jan. 5, 1926.

1,568,639

UNITED STATES PATENT OFFICE.

WILLIAM BASIL SWART, OF JOHANNESBURG, TRANSVAAL, SOUTH AFRICA, ASSIGNOR OF ONE-HALF TO ERNEST STANSFIELD RATCLIFFE, OF CAPE TOWN, SOUTH AFRICA.

VARIABLE-VELOCITY-RATIO GEARING.

Application filed May 17, 1922. Serial No. 561,781.

*To all whom it may concern:*

Be it known that I, WILLIAM BASIL SWART, a subject of the King of Great Britain, residing at 74 Fox Street, Johannesburg, Transvaal Province of the Union of South Africa, have invented certain new and useful Improvements in Variable-Velocity-Ratio Gearing, of which the following is a specification.

This invention relates to variable velocity ratio gearing connecting a driving and a driven shaft, in which the velocity ratio is automatically varied by variation of the speed of the driving shaft or by variation of the load on the driven shaft, and comprises a planet pinion to which a variable braking effect is applied by a vane rotating in a liquid or a gas.

The accompanying drawing shows how the said invention may be conveniently and advantageously carried into practice.

In this drawing:—

Fig. I is a diagrammatic central horizontal section of gearing embodying this invention, and Fig. II shows a vertical section on the line A—A, Fig. I.

As shown in the drawing B is a driving shaft connected through a clutch C to a spur wheel D in gear with planet pinions E through pinions $E_1$. In the drawing two planet pinions E are shown but only one, or any other convenient number of such pinions may be provided. These pinions are keyed to spindles G carried in frame plates 1, 2, 3 mounted to rotate co-axially with the shaft B and spur wheel D. Vanes F are also keyed to the spindles G and are shown in the drawings as flat plates but they may be curved, corrugated or of any other suitable shape. The frame plates 1, 2, 3 are secured together by bolts H so that they rotate as a whole, carrying with them the spindles G.

A driven shaft J is fast with the frame plates, which are shown housed in a closed stationary casing K which may be filled with any desired fluid. Suitable means are provided to prevent leakage between the casing K and the shafts B and J. When air at atmospheric pressure is used as the fluid the casing K may be dispensed with.

The operation of the gearing is hereinafter described and the description will be more readily understandable if the casing K is considered as being filled with a liquid, though the operation is the same even if air at atmospheric pressure is used. In either instance, the vanes F are constantly subjected to the action of the liquid or fluid, due to the provision of the open frame constituted by the plates 1, 2 and 3, such frame enabling the liquid or fluid to have constant access to the vanes, as will be apparent.

Assume the driven shaft J is held stationary. The plates 1, 2, 3 are also held stationary since they are rigidly attached to the shaft J. The spindles G are, therefore, held against rotation around the axis of shaft B and if shaft B is assumed to be rotating in a clockwise direction the wheels E are also rotating in a clockwise direction, the vanes F offering a resistance to rotation depending on the density of the liquid used.

Assume that the shaft J is absolutely free and that shaft B is revolving in a clockwise direction. The plates 1, 2 and 3 are now free to revolve and with them the spindles G are free to revolve around the axis of shaft B.

If the wheels E were unable to revolve about their axes the shaft J would be revolved in a clockwise direction at the same speed as shaft B.

The foregoing are the two extreme cases.

Assume now that there is a certain amount of resistance to turning of the shaft J, that shaft B is revolving at a definite speed and that wheels E are revolving about their own axes G and also about the axis of shaft B.

The vanes F are revolving with the wheels E at certain angular velocities with regard to the axes of spindles G and shaft B respectively.

Suppose that the resistance to turning of shaft J increases. This means that the angular velocity of wheels E about the axis of shaft B tends to decrease and for this to occur the angular speed about the axes of the spindles G must tend to increase.

The greater the angular velocity of wheels E about B the greater is the resistance to the revolution of the wheels E about the axes of spindles G, due to the action of the liquid on the vanes F, which tends to stop them rotating in a clockwise direction about the spindles G. Consequently, when the angular velocity of wheels E about the axis of shaft B tends to fall, the angular velocity about the spindles G tends to increase, thus increasing the ratio between the speeds of shafts B and J, the shaft B still revolving at the same speed. For any given speed of the driving shaft B and any given resistance to rotation of the shaft J there will be one particular velocity ratio depending on the fluid used.

It will be seen that the change of velocity ratio is automatic depending on the load on the driven shaft. For example, in a motor car fitted with such a gear, the load on the driven shaft is a maximum when starting from a stationary position and at the moment of starting the velocity ratio is great, in other words the car is in low gear. When the car is running at constant speed along a level road the load on the driven shaft is a minimum and the car is in top gear. When a hill is encountered the velocity of ratio of the gear automatically increases according to the load on the driven shaft.

I claim:

1. Variable speed gearing, comprising axially-alining driving and driven shafts; a pinion fixed to the drive shaft; an open frame embodying a set of plates connected together in spaced, parallel relation and fixed to the driven shaft; a spindle journaled in said frame plates to rotate therewith and also to rotate about its own axis; a planet pinion fixed to said spindle and gearing with the first-named pinion; and a vane fixed to said spindle to be constantly subjected to the action of a fluid and thereby resist the rotation of the spindle and its planet pinion.

2. Variable speed gearing, comprising axially-alining driving and driven shafts; a pinion fixed to the drive shaft; a set of frame plates connected together in spaced, parallel relation and fixed to the driven shaft; a spindle journaled in said frame plates to rotate therewith and also to rotate about its own axis; a planet pinion fixed to said spindle and gearing with the first-named pinion; a vane fixed to said spindle; and a casing enclosing the frame plates and connected parts and filled with liquid.

3. Variable speed gearing, comprising axially-alining driving and driven shafts; an open frame embodying a pair of outer plates and an inner plate connected together in spaced, parallel relation and fixed to the driven shaft; a pinion fixed to the drive shaft between the inner and one of the outer frame plates; a plurality of transmission gears carried by and mounted between said inner and outer frame plates in mesh with said pinion; a plurality of spindles, one for each transmission gear, journaled in the frame plates to rotate therewith and also to rotate about their own axes; a pinion secured to each spindle between the first-named frame plates and meshing with the adjacent gear; and vanes secured to each spindle between said inner frame plate and the other outer frame plate to be constantly subjected to the action of a fluid and thereby resist the rotation of the spindles and their pinions.

In testimony whereof I affix my signature.

WILLIAM BASIL SWART.